Oct. 10, 1939. L. G. PENDER 2,175,814
DOUBLE SNAP FASTENER AND INSTALLATION THEREOF
Filed Feb. 23, 1935
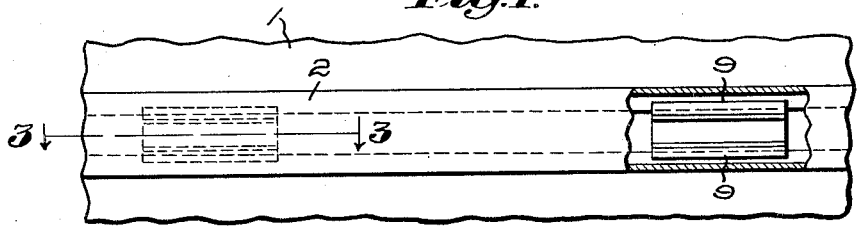
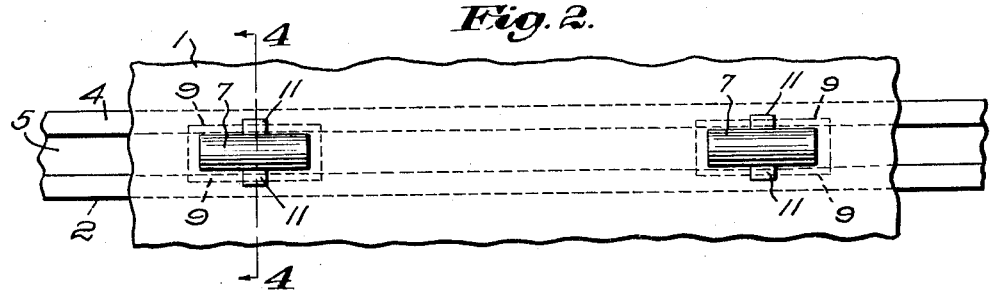
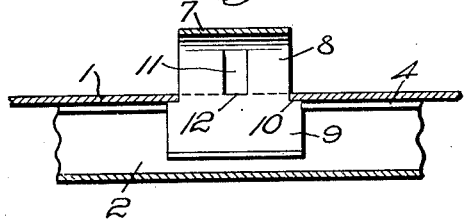
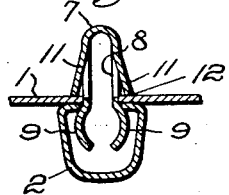
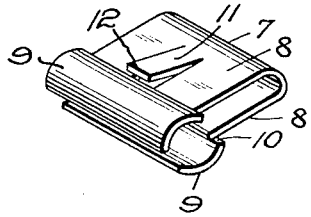
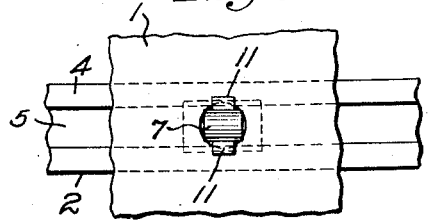
Inventor:
Lloyd G. Pender,
by Walter S. Jones
Atty.

Patented Oct. 10, 1939

2,175,814

UNITED STATES PATENT OFFICE 2,175,814

DOUBLE SNAP FASTENER AND INSTALLATION THEREOF

Lloyd G. Pender, Detroit, Mich., assignor to United-Carr Fastener Corporation, Cambridge, Mass., a corporation of Massachusetts Application February 23, 1935, Serial No. 7,691

13 Claims. (Cl. 189—88)

The present invention relates to snap fastener installations of the type permitting two metal or rigid bodies to be fastened together, and the invention aims generally to improve existing snap fastener installation.

More particularly the invention relates to an improved concealed snap fastener installation whereby hollow bodies such as for example a channel shaped metal molding strip, may be quickly and securely attached to a suitable supporting surface.

In the drawing which illustrates preferred forms of the invention:

Figure 1 is a front elevation of a supported member connected to a metal supporting body, a portion of the supported member being broken away to show the fastener;

Fig. 2 is a rear elevation thereof, looking at the installation from the side of the supporting member;

Fig. 3 is a detail longitudinal sectional view taken on the line 3—3 of Fig. 1;

Fig. 4 is a detail transverse sectional view taken on the line 4—4 of Fig. 2;

Fig. 5 is a perspective view of one type of fastener according to the invention; and Fig. 6 is a rear view of an installation similar to one end of Fig. 2 but showing a fastener of my improved type in a round hole in the supporting member.

The particular installation illustrated in the drawing comprises a supporting member 1, which may be of any form, as for example a wall, ceiling, or section of a vehicle body, to which it is desired to secure a hollow supported member 2, such as for example, conduit, molding strips or the like. The supporting member may be a sheet metal plate provided with apertures 3 for the reception of the fasteners, and the supported member 2 may be in the form of a channel shaped molding strip having a hollow interior and inwardly extending side flanges 4 defining between them a slot 5.

According to the invention I provide a double snap fastener 6 preferably constructed of spring metal, and advantageously of U-shape, as shown (see Figs. 4 and 5) to provide at the bight of the U a head 7 and resilient sides 8, the lower extremities of which are formed as feet or prongs 9, there being a reduced or shouldered neck 10 between the sides 8 and prongs 9. Advantageously the portions 9 may be oppositely curved or crowned as shown, so as to provide resilient stud or prong members adapted to be snapped into the opening of one of the members 1 or 2.

The sides of the fastener preferably are also cut or shaped to provide resilient prongs 11 projecting outwardly from the head, the lower extremities 12 of the prongs terminating short of the neck 10 according to the thickness of the support 1. Thus the central portion of the fastener, i. e., the head 7 and sides 8 constitute a stud member, and may be inserted in openings in either the support 1 or supported member 2, opposite the member receiving the prongs or feet 9, and be snapped into locking position by reason of the engagement of the extremities 12 of the prongs 11 on a face of the member receiving it.

As will be apparent, the invention provides a double snap fastener, in that there are opposed stud portions adapted to be snapped into openings in the support or supporting member.

The invention is particularly useful in providing simple means for quickly securing hollow members 2, such as a channel shaped molding strip, to a supporting plate. In making such an installation, one end of the fastener 6, as for example the head end, is inserted in an opening in the supporting member 1, shown as rectangular with the device of Figs. 1 through 5 and circular with the device of Fig. 6, and when properly positioned therein, the prongs 11 will snap into engagement with the adjacent surface of the support 1, securely to hold the fastener in place. The channel shaped molding strip 2 may be then readily snapped over the resilient prongs 9, and the installation is complete with the fastener concealed from view as in Fig. 1. It will, of course, be apparent that either end of the fastener 6 may be positioned within the supporting member depending upon the size, shape and proportions of the supporting member and that the shape and size of the fastener may be considerably varied to suit different conditions of the parts to be secured together. In any event I do not wish to be limited to the exact shapes of the fasteners shown in Figs. 2 and 6.

The double fastener illustrated herein is simple in construction and very inexpensive to manufacture. It is obviously susceptible of various forms and shapes, depending upon the shape and configuration of the parts to be connected.

While I have described preferred embodiments of the invention, I do not wish to be limited thereby, because the scope of the invention is best defined in the appended claims.

I claim:

1. A snap fastener installation comprising a plane surfaced apertured support, a hollow supported member having inturned flanges and a one-piece sheet metal double stud fastener adapted to be snapped into an aperture of said support and the interior of the supported member, the part of said fastener extending beyond the support on the side of the supported member lying wholly within said member and engaging the inturned flanges thereof permitting a flush contact between the plane surface of said support and the flanges of said supported member.

2. A snap fastener installation comprising an apertured metal support, and a hollow channel-shaped molding strip having inwardly turned flanged edges, a double ended fastener of one piece folded sheet metal construction having a yieldable portion inserted in the aperture of said support and snapped into locking engagement with a surface thereof, the remainder of said fastener extending beyond the opposite face of said support being wholly confined within the molding and presenting yieldable portions adapted to be snapped into engagement with the molding flanges.

3. The combination with a supporting member having spaced apertures therein, and a channel member having inturned flanges adapted to be secured to said support, of a separate fastening device formed of a single piece of spring sheet metal, one portion of said fastening device being adapted to be inserted through an aperture in the supporting member and snapped into locking engagement with the opposite face thereof, the remainder of said fastening device extending beyond the front face of said support and presenting prelocated snap fasteners adapted to be inserted wholly within the channel member and snapped into engagement with the internal flanges thereof.

4. A double snap fastener for connecting a hollow supported member to an apertured support member comprising an elongated U-shaped metal body having open ends and resilient sides, foot portions connected to the sides having a part projecting from the plane of the sides, said projecting part having a portion adapted to be snapped into engagement with a surface of either the support or supported member, and resilient prongs on the body adapted for engagement with the other of said members, the free ends of said prongs being spaced from the engaging portions of said projecting part of said foot portions a distance substantially equal to the thickness of the said members.

5. A double snap fastener for connecting a hollow supported member to an apertured support member comprising a one-piece U-shaped metal body having open ends and resilient sides, foot portions connected to the sides having a part projecting from the plane of the sides, said projecting part having a portion adapted to be snapped into engagement with a surface of either the support or supported member, and resilient prongs cut from the body adapted for engagement with the other of said members, the free ends of said prongs being spaced from the engaging portions of said projecting part of said foot portions a distance substantially equal to the thickness of said members.

6. A double snap fastener for connecting a hollow supported member to an apertured support member comprising a U-shaped metal body having resilient sides, foot portions connected to the sides having a part projecting from the plane of the sides, said projecting part having a portion adapted to be snapped into engagement with a surface of either the support or supported member, and resilient prongs on the body adapted for engagement with the other of said members, the free ends of said prongs being spaced from the engaging portions of said projecting part of said foot portions a distance substantially equal to the thickness of the said members.

7. A double snap fastener formed entirely from a single piece of sheet metal and constructed and arranged as a single unit complete in and of itself for securing together two apertured members, one portion of said member being provided with yieldable snap fastener portions adapted to snap through an aperture in one of said members and another and different portion also provided with yieldable snap fastener portions adapted to snap through an aperture in the other member for the purposes described the body portion of the fastener between the opposed fastener portions being of less dimension than the fastening portions permitting securing the two members together in flush contacting relationship.

8. A double snap fastener formed entirely from a single piece of sheet metal folded into a construction adapted to secure together two apertured members, one end portion of said fastener having oppositely arranged portions yieldable toward and away from each other and shaped to make snap fastening engagement with one of said members through its aperture and the other end portion of said fastener having oppositely arranged portions yieldable toward and away from each other and shaped to engage the other member through its aperture and the neck portion of the fastener between the pairs of oppositely disposed yieldable portions lying wholly within the apertures of said two members.

9. A retaining device for securing together a plurality of members having openings, respectively, and the openings being aligned with each other, and comprising a strip of resilient spring metal having portions in the form of spaced legs adapted to be inserted into an associated opening of one of the members and having a portion in the form of a locking shoulder arranged for engagement with the inner face of the member in which the legs of the device are inserted, and said device having a portion in the form of a head with a shoulder portion thereon in opposition to said locking shoulder and disposed in spaced relation to the locking shoulder, endwise of the device, a distance equal to or slightly less than the overall dimension of those portions of the members to be received between the shoulder portion and locking shoulder, and said device having a portion in the form of a land positioned longitudinally of the device between the shoulder portion and locking shoulder for engaging one of the members in which the legs have been inserted and spacing the shoulder portion therefrom when the device is installed in the last mentioned member.

10. A spring metal clip for securing a member having an opening to a support having an aperture and a face to face relation to said support and comprising a single strip of relatively flat spring metal having a portion in the form of spaced legs with locking shoulders and having head portions beyond the legs, which head portions are movable relatively toward and away from each other by flexure of the metal for reception through the opening in the member, said slip having portions positioned longitudinally of the clip between the head portions and locking shoulders and in the form of land shoulder portions which are wider than the legs, said legs insertable end foremost through the aperture in the support from the outer face thereof to dispose the locking shoulders in contact with the support at the inner face of the support, the land shoulders being positioned longitudinally of the clip in a position to engage the outer face of the support when the locking shoulders engage the inner face of the support, and said head portions being adapted for reception through the opening in the member with a snap action and being spaced from the outer face of the support by said land portions.

11. A spring clip device for securing a hollow member having an opening in one face to a support having an aperture and in juxtaposition with the outer face of the support and comprising a single piece of spring metal having a portion in the form of legs receivable endwise through the aperture in the support and having a portion in the form of a head adapted for reception through the opening in the member to be supported by flexure of the head consequent upon pressing the member thereonto toward the outer face of the support after the clip is installed in the support, and said clip having a land portion positioned with respect to the clip to engage the outer face of the support when the clip is installed and to space said head outwardly from the outer face of the support a distance less than the thickness of the portion of the member received between the head and support, and said clip having a portion engageable with the inner face of the support for resisting outward withdrawal of the clip from the aperture.

12. A double snap fastener formed entirely from a single piece of metal and constructed and arranged as a single unit complete in and of itself for securing together an apertured member and a molding having spaced inturned flanges, one portion of said fastener being provided with yieldable snap fastener portions adapted to snap through an aperture in one of said members, and another and different portion also provided with yieldable snap fastener portions adapted to snap through an aperture in the other member for the purposes described, the portion of the fastener between the opposed fastener portions having a pair of shoulders to rest on said apertured member at opposite sides of said aperture and being of less dimension than the space between said flanges permitting securing the two members together in flush contacting relationship.

13. A snap fastener installation, comprising an apertured metal support, and a hollow channel-shaped molding strip having inwardly turned flanged edges, a double-ended fastener of one piece metal construction having a yieldable portion inserted in the aperture of said support and snapped into locking engagement with a surface thereof, the remainder of said fastener extending beyond the opposite face of said support being wholly confined within the molding and presenting yieldable portions snapped into engagement with the molding flanges and engaging said flanges forwardly and rearwardly of said aperture.

LLOYD G. PENDER.